(12) United States Patent
Bates (10) Patent No.: US 6,658,650 B1
(45) Date of Patent: Dec. 2, 2003

(54) SERVICE ENTRY POINT FOR USE IN DEBUGGING MULTI-JOB COMPUTER PROGRAMS

(75) Inventor: Cary Lee Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/507,418

(22) Filed: Feb. 18, 2000

(51) Int. Cl.$^7$ ............................. G06F 9/44; G06F 9/00
(52) U.S. Cl. ..................... 717/127; 717/128; 717/129; 717/131; 709/106
(58) Field of Search ................... 717/131, 127, 717/128, 129; 709/106

(56) References Cited

U.S. PATENT DOCUMENTS

| | | | | |
|---|---|---|---|---|
| 5,193,186 A | * | 3/1993 | Tamaki et al. | 709/106 |
| 5,297,274 A | * | 3/1994 | Jackson | 703/22 |
| 5,632,032 A | * | 5/1997 | Ault et al. | 717/131 |
| 5,943,498 A | * | 8/1999 | Yano et al. | 717/128 |
| 5,953,530 A | * | 9/1999 | Rishi et al. | 717/127 |
| 6,009,269 A | * | 12/1999 | Burrows et al. | 717/131 |
| 6,256,775 B1 | * | 7/2001 | Flynn | 717/127 |
| 6,378,124 B1 | * | 4/2002 | Bates et al. | 717/129 |

OTHER PUBLICATIONS

D. D. Redell, "Experience with topaz telebugging", 1988, ACM, p. 35–44.*

K. K. Leung, "An Execution/Sleep Scheduling Policy for Serving an Additional Job in Priority Queuing Systems", 1993, ACM, vol. 40, No. 2, p. 394–417.*

Soltis, Frank G., *Inside the AS/400: Featuring the AS/400e series*, Loveland, Colorado, Duke Press (1997), pp. 179–224.*

* cited by examiner

*Primary Examiner*—Todd Ingberg
*Assistant Examiner*—Gamrun Nahar
(74) *Attorney, Agent, or Firm*—Wood, Herron & Evans (57) ABSTRACT

An apparatus, program product and method utilize a service entry point to trigger under a predetermined set of conditions to facilitate gaining control of a created job in a multi-job environment, namely when the job within which the service entry point was hit is not currently under debug, the job has an attribute that is common to another job that established the service entry point, and there is another job waiting to begin servicing a job having the same attribute. By conditioning a service entry point on these conditions, service operations may be initiated on a created job with significantly less difficulty, e.g., by automatically halting the job hitting the service entry point and/or providing the pending service job with a job identifier to identify to such service job of the identity of the job within which the service entry point was hit.

20 Claims, 4 Drawing Sheets

SERVICE ENTRY POINT FOR USE IN DEBUGGING MULTI-JOB COMPUTER PROGRAMS

FIELD OF THE INVENTION

The invention is directed to debuggers and debugging of computer programs. In particular, the invention is directed to debugging multi-job computer programs.

BACKGROUND OF THE INVENTION

The process of locating, diagnosing and correcting logical errors, or 'bugs', in computer application source code is generally referred to as "debugging" in the context of computer programming. A broad array of software designed to assist in debugging has been commercially developed and made available for the purpose of more efficiently troubleshooting programming errors that occur in developing software. Most conventional debuggers allow a computer programmer to conduct a series of commands or tests that reveal information pertaining to the configuration and veracity of a developing program's source code. A typical debug operation consists of a programmer 'stepping' through a series of program statements using debug commands to identify and fix encountered errors. While such an undertaking can be time consuming and tedious for a programmer even under ideal conditions, the task of debugging is compounded dramatically when conducted in operating environments where the application being debugged spans multiple jobs that are executing simultaneously.

A 'job' refers to a single process, or task, that is performed by a computer. Each job consists of allocated memory known as working storage and one or more execution states known as threads, which follow the control flow of program code saved in working storage. Jobs have unique designators associated with them for the purpose of identifying a particular job. A user who desires to perform a specific computer operation designates the execution path corresponding to the operation, and the associated job is accordingly 'created.' A computer processor in turn executes the conjured job, and the user's desired operation is initiated. A computer processor cycles through a sequence of jobs, generally servicing in some capacity each job in the order received. The processor can service a job to various execution states, including terminated ('killed'), suspended, or actively running jobs. Examples of jobs literally include every definable task which may be performed by a computer, including software initializations, the printing of computer files, and the creation of other jobs, among others.

A typical user's session may require that multiple jobs be concurrently initiated and executed. This is not only due to the increasing volume and complexity of tasks generally performed by computers, but is also because the proper execution of certain, user-designated jobs may be dependent upon the presence of other jobs running in the background. Some languages may also require incompatible operating environments for different aspects of a computer program, necessitating multiple jobs to handle the different operating environments.

Multiple job environments, however, can significantly complicate the debugging process—particularly when certain jobs are not amenable to debugging directly within such jobs. For example, in a scenario where a debug process must be performed on a batch job, it may not be possible to perform debugging directly on the batch job because the batch job may not have access to the user interface of the programmer's terminal, or the user interface may be otherwise occupied or unavailable. In other instances, it may not be practicable to perform a debug process directly within a job when the actual display of information by the job is of concern, e.g., if the job displays graphical information that would be occluded or misaligned due to the display of debug messages.

To address this concern, a number of multi-job environments support the ability for one job, known as a utility job or a service job, to service another job, such that the service job essentially handles user interaction with a debugger during debugging of a serviced job. Although performing a debug operation using such a service operation can help avoid some of the above mentioned pitfalls, there remain inherent obstacles to establishing the necessary communication between service jobs and jobs requiring debugging. In particular, conventional environments often require a request to perform a service operation to provide the identity of the job to be serviced, e.g., by providing a unique job identifier associated with the job to be serviced. However, the job identifier for a job is typically not assigned until after the job is created, or 'spawned'. As such, whenever it is desirable to debug a job through a service operation, a programmer must be able to gain control of the job to be serviced prior to initiating the service operation.

Control is obtained over a job when execution of the job has been suspended and user interaction with the job is permitted to perform debugging and/or other service operations. One conventional service used to gain control of jobs relies on the use of 'global breakpoints.'

A global breakpoint is a type of control point that can be set and detected during execution of a computer program to perform a particular debug operation on the computer program. Specifically, a global breakpoint in a computer program causes any active job that uses the computer program to stop when the global breakpoint is encountered by that job. Under ideal circumstances, this mechanism can permit a user to gain control of a job to be debugged, allowing a debugging process to initiate at an appropriate instance in a developing program's source code. However, under normal operating conditions, global breakpoints can significantly degrade the performance and availability of a computer since all jobs that hit the global breakpoint, even those not under debug, will trigger the breakpoint. Furthermore, in single-level store computer environments where multiple users share a common copy of a computer program, a breakpoint in the computer program may be hit by all jobs that use the computer program, regardless of whether the users that own the jobs are actively debugging the computer program.

When a conventional global breakpoint is encountered, execution of the job that hit the breakpoint is suspended, and the encounter is reported to the user performing debugging. If the owner of the job is not performing the debugging, however, the job essentially appears hung or stalled to the owner until it is restarted by the user performing the debugging. As such, global breakpoints can be significantly disruptive in many computer environments.

Therefore, a significant need exists for a manner facilitating debugging in multi-job environments. In particular, a significant need exists for a manner of identifying and gaining control of jobs created in a multi-job environment to facilitate the performance of debugging and other service operations thereon.

SUMMARY OF THE INVENTION

The invention addresses these and other problems associated with the prior art by providing an apparatus, program product and method in which a type of control point, referred to hereinafter as a service entry point, is established in a computer program to trigger under a predetermined set of conditions to facilitate gaining control of a created job in a multi-job environment. Specifically, a service entry point consistent with the invention is triggered when the following conditions are true:

(1) the job within which the service entry point was hit is not currently under debug;

(2) the job has an attribute that is common to another job that established the service entry point; and (3) there is another job waiting to begin servicing a job having the same attribute.

By conditioning a service entry point on the aforementioned conditions, service operations may be initiated on a created job with significantly less difficulty. For example, as a consequence of a service entry point meeting the aforementioned conditions, the job hitting the service entry point under such conditions may be automatically halted, thereby facilitating the gaining of control of the job. In addition, the pending service job waiting to begin servicing the job that hit the service entry point may be provided with a job identifier such that a service operation may be initiated on the created job using the job identifier. As a consequence, the drawbacks typically associated with conventional multi job environments, namely the inability to identify and/or gain control of created jobs, may be substantially avoided.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The illustrated embodiments of the invention utilize service entry points to facilitate the debugging of multi-job computer programs. Specifically, service entry points are created to enable control to be gained over created or spawned jobs without requiring the identity of such created jobs to be known before hand by a user performing debug operations on such created jobs.

A service entry point consistent with the invention operates as a global (i.e., accessible to multiple jobs), conditional control point that is triggered in a particular job based at least on the occurrence of three conditions:

(1) the job is not currently under debug;

(2) the job has an attribute that is common to another job that established the service entry point; and (3) there is another job waiting to begin servicing a job having the same attribute.

In addition, a service entry point may also be conditioned on other types of conditions that other types of breakpoints or other control points may be conditioned upon. For example, a service entry point could also be conditioned on a variable having a value that falls within a predetermined range.

The attribute used to link service entry points with different jobs is typically, but not exclusively, based upon the identity of the user performing the debug operation, e.g., based upon a user ID associated with the service entry point and the jobs utilized in the debug operation. However, other attributes may be used in the alternative, e.g., group ID's that identify groups of users so that multiple users from the same group can collectively utilize a service entry point in debugging a multi-job computer program, values of a particular environmental variable, etc.

In addition, as will become more apparent below, once control is obtained over a created job via a service entry point, various service operations may be performed. For example, a debug operation may be manually or automatically initiated on the created job. Other service operations, e.g., displaying a call stack or performing a job trace, etc., may also be performed consistent with the invention.

Figure 1:
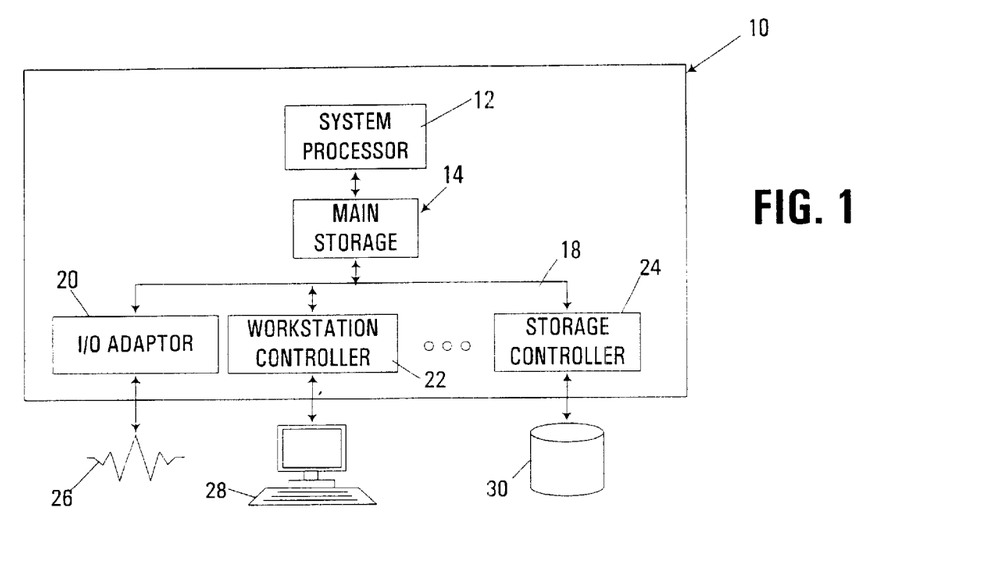
FIG. 1 is a block diagram of a computer implementing service entry points consistent with the invention.

Turning to the Drawings, wherein like numbers denote like parts throughout the several views, FIG. 1 illustrates a computer 10 consistent with the invention. Computer 10 is shown for a multi-user programming environment that includes a system processor 12 including one or more microprocessors that obtain instructions, or opcodes, and data from a main storage 14. Computer 10 may be implemented as a PC-based server, a minicomputer, a midrange computer, a mainframe computer, etc.

It should be appreciated that main storage 14 may incorporate one or a combination of memory devices, including random access memory, nonvolatile or backup memory (e.g., programmable or flash memories, read-only memories, etc.). In addition, main storage 14 may be considered to include memory storage physically located elsewhere in computer 10, e.g., any storage capacity used as virtual memory or stored on a mass storage device or on another computer coupled to computer 10, or any cache memory incorporated with system processor 12.

Computer 10 may include a number of operators and peripheral systems interfaced over a system input/output (I/O) bus 18, including an input/output adaptor 20 interfacing the computer with an external network 26, a workstation controller 22 interfacing the computer with one or more workstation terminals 28, and a storage controller 24 interfacing the computer with one or more mass storage devices 30.

For purposes of the invention, computer 10 may represent practically any type of computer, computer system or other programmable electronic device, including a client computer, a server computer, a portable computer, an embedded controller, etc. Computer 10 may be a standalone device or networked into a larger system.

In the illustrated embodiment, computer 10 is implemented as a single-level store multi-user computer system such as the AS/400 midrange computer available from International Business Machines Corporation. With a single-level store computer, a large virtual memory space is provided, incorporating both main storage memory and additional memory found in one or more storage devices. Virtual memory addresses are accessed without regard to where the actual data for those addresses is found. Low level routines in the computer insure that requested data is buffered into the main storage as needed. As a consequence of this configuration, the program code for a computer program stored in the computer is typically shared by all users having appropriate access rights. One user with appropriate authority can therefore modify program code in a computer program, and have such modifications affect the execution of the computer program by other users. In the alternative, computer 10 may be implemented as a multi-level store, where the file system is maintained separately from main storage, such that requests for data must be directed to either the main storage or file system as appropriate.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
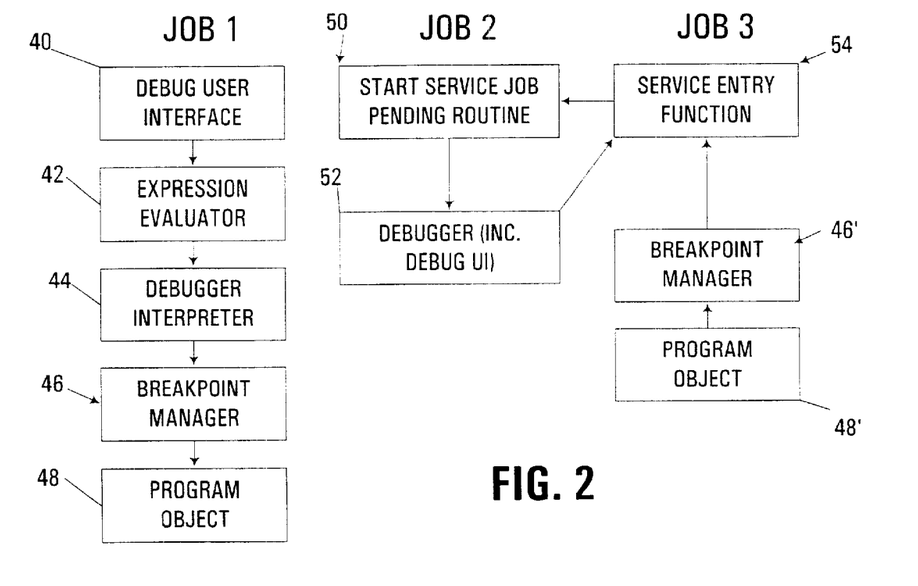
FIG. 2 is a block diagram of the primary software components utilized in the computer of FIG. 1 to set and process service entry points.

Referring to FIG. 2, an exemplary software environment is shown for implementing service entry points in a single-level store computer such as the AS/400 midrange computer.

Such implementation of service entry points requires facilities to set service entry points, as well as facilities to handle service entry points when encountered during execution of a computer program. As shown in FIG. 2, the software components required to set service entry points are shown in a first job (Job 1), including a debug user interface 40, an expression evaluator 42, a debugger interpreter 44, a breakpoint manager 46 (collectively comprising a debugging environment), and used to set a service entry point in a program object 48. As illustrated by the association of these components, a user typically sets a service entry point by interacting with debugger user interface 40, with appropriate commands passed from component 40 to each of components 42, 44 and 46, resulting in modification of the program object 48 to incorporate the service entry point.

The software components involved in handling service entry points are shown in FIG. 2 as executing in two additional jobs (Job 2 and Job 3). As used hereinafter, Job 2 is a service job that is utilized to gain control of a serviced Job 3. To handle service entry points, a new type of command, referred to hereinafter as a start service job pending (STRSRVJOBPND) command, is supported to permit a service job to register that it is awaiting a job to service meeting the aforementioned enumerated conditions. Handling of the STRSRVJOBPND command is performed by STRSRVJOBPND routine 50, which interfaces with a debugger component 52 in Job 2, which essentially represents components 40–46 accessed by job 1 (including most notably the debug user interface), but accessed by Job 2. Component 52 handles user interface with a programmer once control over Job 3 has been gained by the service job (Job 2).

To handle the encounter of a service entry point, Job 3 executes a program object and breakpoint manager (here designated as 48' and 46', respectively, to signify that these components are the same as the corresponding unprimed components accessed by Job 1 given the single-level store nature of computer 10). A service entry point is detected in the program object, resulting in detection of the service entry point by the breakpoint manager, and further resulting in the execution of a service entry function 54 to handle the service entry point.

Figure 3:
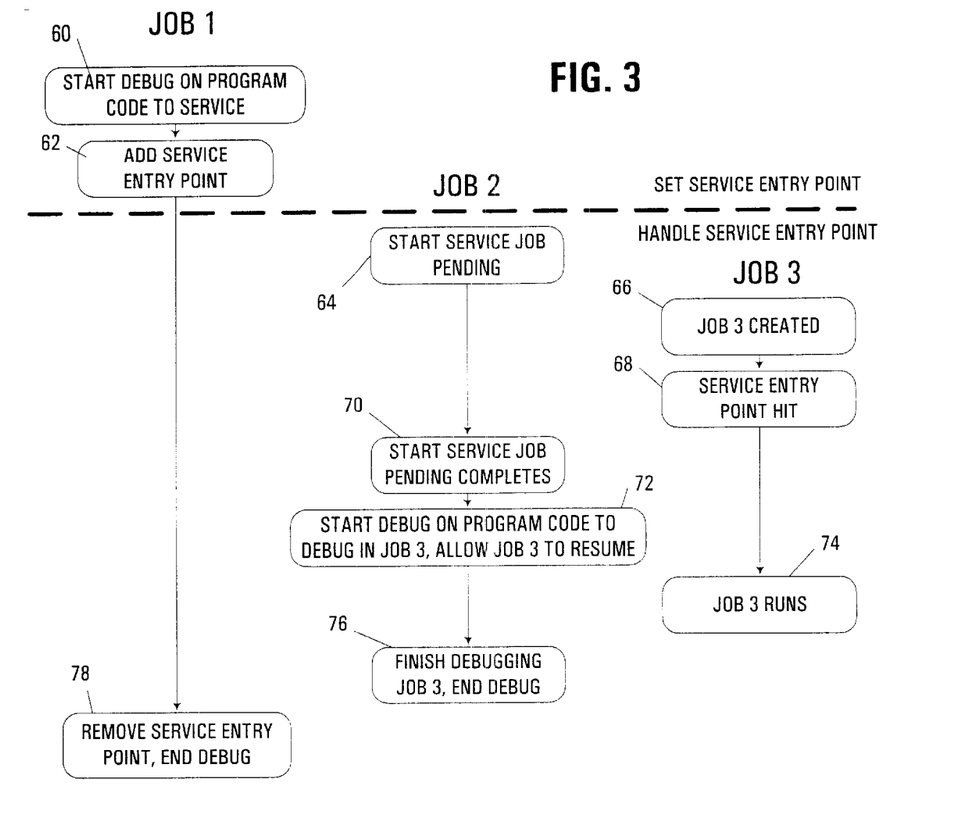
FIG. 3 is a flowchart illustrating the sequence of operations that occur in the computer of FIG. 1 during setting and processing of a service entry point.

FIG. 3 next illustrates the overall sequence of operations that occur in setting and handling a service entry point. As with FIG. 2, setting a service point is performed by a first job (Job 1), with a separate service job (Job 2) servicing a created job (Job 3) in a multi-job environment. It should be appreciated, however, that the functions of setting a service entry point and registering as a service job to handle a service entry point may be performed by the same job in some instances.

Generally, to set a service entry point, a user requests to start debugging specific program code for which it is desirable to service. On an AS/400 computer, this is performed by initiating a "STRDBG" command to a debug user interface, as shown in block 60. Next, as represented in block 62, a service entry point is added to the program code, in a similar manner to creation of a conventional breakpoint.

Once the service entry point is set, some time in the future it may be desirable to debug the multi job computer program within which the service entry point is set. Initiation of this operation is performed by establishing a second job (Job 2) and issuing a STRSRVJOBPND command in block 64 to request that Job 2 be registered as a service job. Once Job 2 is registered, at some point later in the future, Job 3 is created, as represented by block 66, and the service entry point is hit, as represented by block 68. Through appropriate interfaces in Job 2 and Job 3 (discussed hereinafter), the STRSRVJOBPND command completes in block 70, with Job 2 being provided with the job ID of Job 3 to permit Job 2 to gain control of Job 3 and perform service operations, such as various debugging operations, on Job 3. One such operation is illustrated in block 72, where a start debug (STRDBG) command is issued on the program code under debug in Job 3, thereby allowing Job 3 to resume and various debug operations to occur therewith. As represented by block 74, Job 3 then continues execution. Sometime in the future, the debugging operation is complete, and an end debug (ENDDBG) command is issued in Job 2, as represented by block 76. Then, as represented in block 78, another job (e.g., Job 1) will eventually remove the service entry point, ending the debugging operation on the program code and removing the service entry point therefrom.

Figure 4:
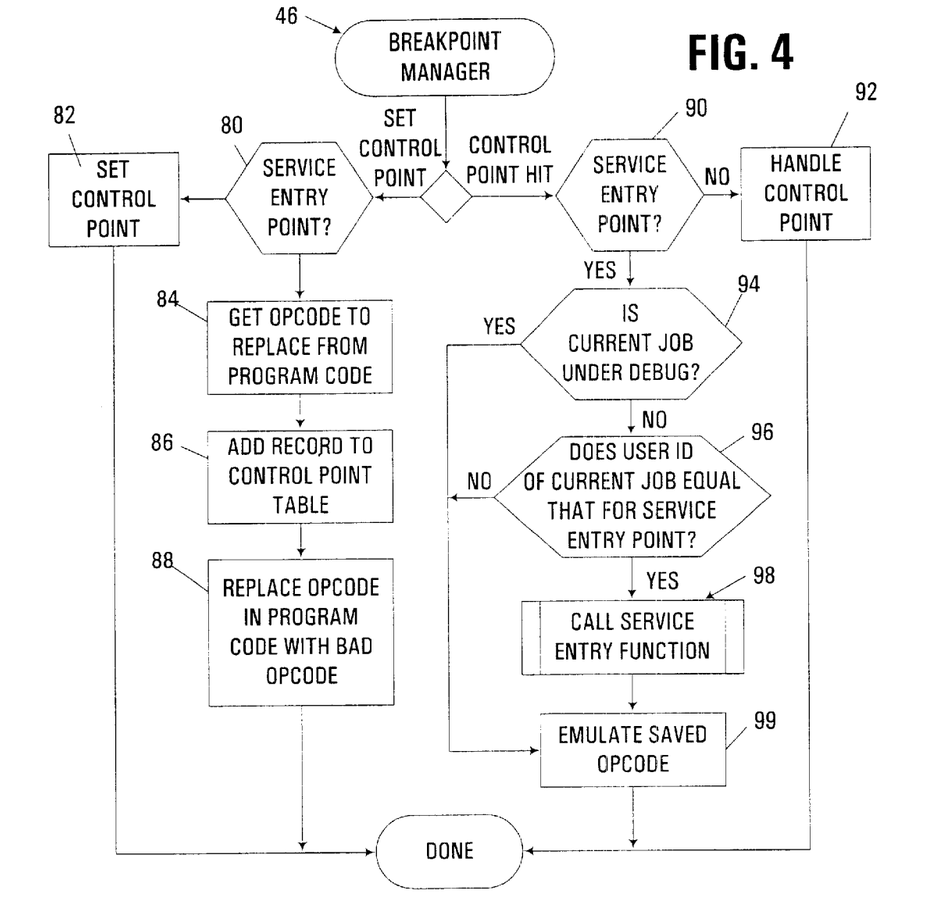
FIG. 4 is a flowchart illustrating the program flow of the breakpoint manager of FIG. 2 during setting and handling of a service entry point.

The precise program flow for the various components of FIG. 2 to implement the functionality described in connection with FIG. 3 is illustrated beginning in FIG. 4. Specifically, FIG. 4 illustrates the program flow of breakpoint manager 46 in greater detail, with the flowchart partitioned into two halves, the left half performing the operations that occur in response to a request to set a control point, and the right half performing the operations associated with detecting the encounter of a control point during execution of a program under debug.

First, with respect to setting a control point, the breakpoint manager starts in block 80 by determining whether the control point to be created is a service entry point. If not, the control point is set in a conventional manner in block 82. If, however, the request is to set a service entry point, control passes to block 84 to retrieve the opcode in the program under debug to be replaced. Next, block 86 adds a record to a control point table, and block 88 replaces the opcode in the program code with a bad opcode to trigger an interrupt during execution of the program such that the breakpoint manager can obtain control when the control point is encountered. It will be appreciated that other manners of signaling a control point in a computer program to setting an invalid opcode may be used in the alternative.

Figure 5:
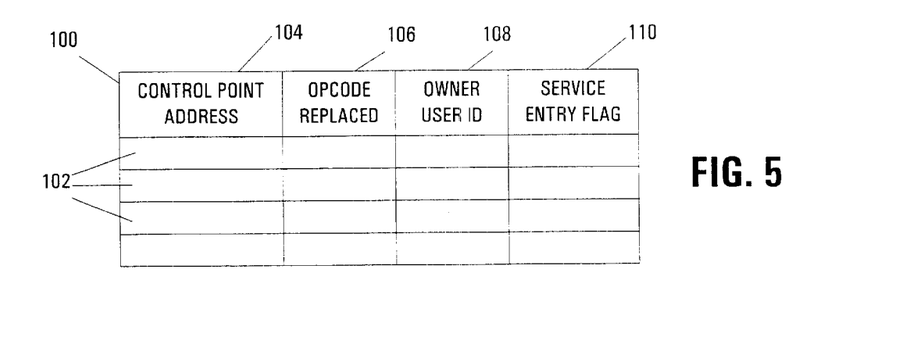
FIG. 5 is a block diagram of a breakpoint table utilized by the breakpoint manager of FIG. 2.

FIG. 5 illustrates one possible configuration for a control point table 100, including a plurality of entries 102, each including a control point address field 104, an opcode replaced field 106, an owner user ID field 108 and a service entry flag field 110. Control point address field 104 stores the address of the control point in the program code under debug. Field 106 stores the opcode that was originally stored at the address. Block 108 stores the user ID of the control point's owner, or user that set the control point. Field 110 stores a service entry flag that indicates whether the control point is a service entry point. In the alternative, service entry points may be stored in a separate data structure from other control points.

Figure 6:
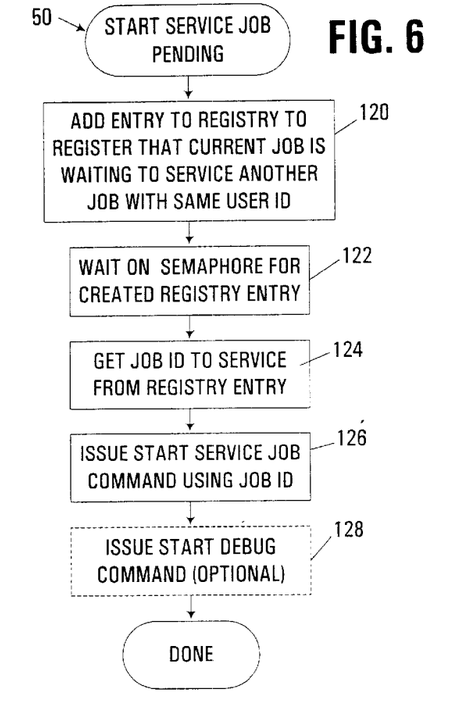
FIG. 6 is a flowchart illustrating the program flow of the start service job pending program code of FIG. 2.

Now turning to FIG. 6, the operations associated with registering a service job to handle debugging of a newly created job in response to detection of a service entry point is illustrated in connection with start service job pending routine 50. As discussed above, a STRSRVJOBPND command is issued when a job wishes to register itself for servicing other jobs. Routine 50 begins in block 120 by adding an entry to a service job registry to register that the current job is waiting to service another job having the same user ID. Next, block 122 waits on a semaphore established for the newly created registry entry, which in effect stalls the service job until a suitable service entry point is hit in another job.

When the semaphore has been released, control passes to block 124 to get the job ID for the job to service from the registry entry. As will be discussed in greater detail below, the job ID is stored in the registry entry by the service entry function operating in response to detection of a service entry point.

Once the job ID has been obtained, the servicing of the newly created job may be initiated, e.g., by issuing a start service job (STRSRVJOB) command, including the job ID of the job to be serviced. It will be appreciated that the STRSRVJOB command is a well known command implemented in the AS/400 midrange computer. Other operations that incorporate the same functionality may be utilized in other environments.

Next, as shown by block 128, it may also be desirable to optionally start a debug process automatically upon starting of the service job, typically by issuing a start debug (STRDBG) command, a known supported command of the AS/400 midrange computer. In the alternative, a user may be required to separately and manually input such a command once the service job has been initiated. In addition, in some environments it may be desirable to support two different service job pending commands, one of which automatically starts a debug process, and the other of which does not. Other modifications will be apparent to one of ordinary skill in the art.

Figure 7:
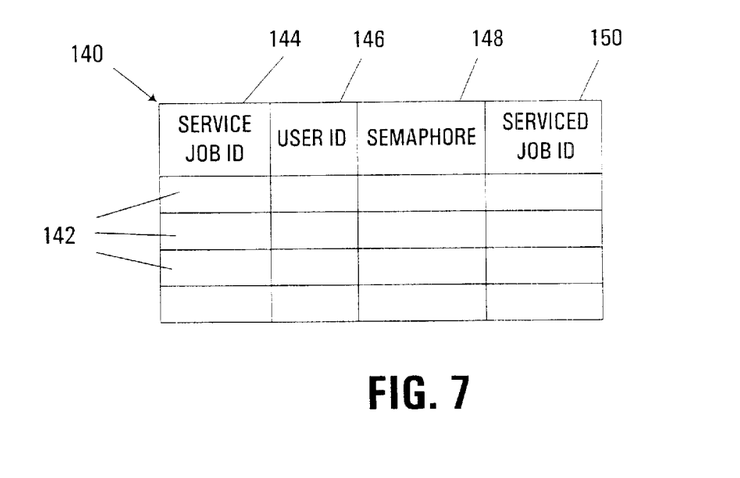
FIG. 7 is a block diagram of a service job pending registry utilized by the start service job pending routine of FIG. 6.

FIG. 7 illustrates one suitable configuration of a service job registry 140, implemented as a table including a plurality of entries 142, each including a service job ID field 144, a user ID field 146, a semaphore field 148 and a serviced job ID field 150. Service job ID field 144 stores the job identification of the service job that is awaiting a service entry point. The user ID field stores the user ID of the user that owns the service job. Field 148 stores a semaphore that is utilized to, at different times, suspend operation of the service job and the serviced job, as will become more apparent below. Field 150, which is initially set to null upon creation of an entry 142, stores the job ID of the serviced job that has triggered a service entry point under the appropriate conditions.

In some embodiments, it may also be desirable to include within each registry entry 142 the fully qualified name of the program that hit the service entry point. Doing so would facilitate automatically starting debug against the program.

Returning to FIG. 4, the operations that occur in response to handling of a control point are illustrated beginning at block 90, where it is determined whether a hit control point is a service entry point. If not, control passes to block 92 to handle the control point in a conventional manner. Returning to block 90, if the hit control point is a service entry point, control passes to block 94 to determine whether the current job is under debug. If not, control passes to block 96 to determine whether the user ID that owns the current job is the same as that stored in the control point table for the service entry point. If so, the service entry function component is called in block 98. Upon completion of the service entry function call, control passes to block 99 to emulate the saved opcode.

Returning to blocks 94 and 96, if either the current job is already under debug, or if the user ID of the current job does not equal that for the service entry point, all of the conditions necessary for signaling a service entry point are not met, whereby control passes directly to block 99 to emulate the saved opcode without halting the program.

Figure 8:
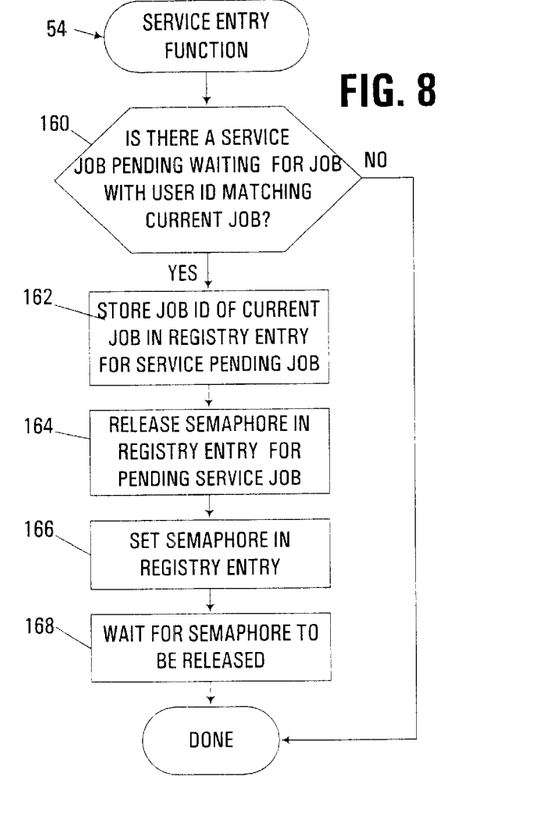
FIG. 8 is a flowchart illustrating the program flow of the service entry function of FIG. 2.

FIG. 8 illustrates the operation of service entry function 54 in greater detail. Function 54 begins in block 160 by determining if there is a pending service job waiting on a job having a user ID matching that of the service entry point, by searching for an entry in registry table 140 matching the user ID owning the current job. If not, the service entry point is disregarded.

If, however, a pending service job is waiting for a job having the same user ID as that owned by the current job, control passes to block 162 to store the job ID of the current job in the registry entry for the service pending job. Next, block 164 releases the semaphore in the registry entry for the pending service job, thereby allowing the STRSRVJOBPND command to complete in the service job (represented by block 122 in FIG. 6). Next, the same semaphore is set in the registry in block 166, thereby suspending further execution of the serviced job, and permitting the service job to initiate servicing of the created job. Execution of the created job is therefore suspended until the semaphore is released, as represented in block 168. Once the semaphore is released, execution of the created job continues in a conventional manner.

Figure 9:
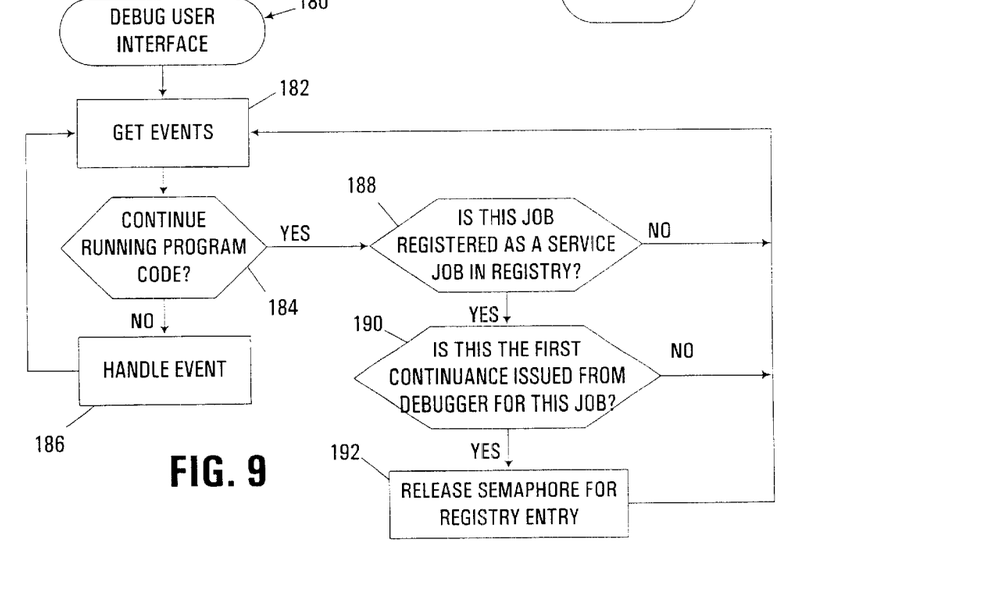
FIG. 9 is a flowchart illustrating the program flow of the debug user interface of FIG. 2.

FIG. 9 next illustrates the appropriate event handling mechanism in the debug user interface executing in Job 2 to continue running the created program code after a start service job command has been issued. Specifically, a routine 180 is illustrated as an event-driven routine, whereby events are received in block 182, and handled as appropriate in one of blocks 184 and 186. A continue running program code event is detected in block 184, and handled by passing control to block 188 to determine whether the current job is registered as a service job in the registry. If so, control passes to block 190 to determine whether this is the first continuance issued from the debugger for this job. If so, the semaphore associated with this registry entry is released, thereby permitting the created job to continue execution. If either of the tests in blocks 188 and 190 fail, block 192 is bypassed. For example, if it is not the first continuance that has been issued from the debugger for this job, the resumption will be handled in a conventional manner as with a conventional STRSRVJOB command.

Returning to block 184, if the event is not a request to continue running program code, control passes to block 186 to handle the event in a conventional manner.

Therefore, in operation, three primary functions are implemented in utilizing service entry points to facilitate debugging of multi-job computer programs. First, a user, primarily via the debug user interface and breakpoint manager, sets a service entry point, and thereby creates an appropriate entry in control point table 100. Next, a job that registers itself as a pending service job, primarily through STRSRVJOBPND routine 50, thereby creating a registry entry in registry 140 to indicate that the job is awaiting a job to service.

Next, debugging of a multi-job program is initiated, and upon encounter of a service entry point, the breakpoint manager and service entry function cooperate to confirm that the predetermined conditions are met, and if so, release the semaphore that is suspending the pending service job, and concurrently suspending the created job within which the service entry point was hit, such that the service job now has control over the newly created job. Service operations such as debugging, displaying a call stack, or job tracing, etc. may then be performed with respect to the newly created job, based upon the job ID provided to the service job via the registry.

As such, it may be appreciated that service entry points have a significant benefit in debugging multi-job computer programs, notably the fact that the precise point or job in which the program code is halted in response to a service entry point is not important. Moreover, the job ID of a newly created job (which is typically generated dynamically upon creation of the job) need not be known to initiate a servicing operation. In addition, a simple mechanism for halting a created job upon its creation, without prior knowledge of the job ID for the job, is also supported.

It will be appreciated that service entry points consistent with the invention may be utilized in other environments. For example, in a multi-level store environment such as the UNIX operating system, service entry points may be utilized, but may require that the master copy of a program be modified to insert the appropriate control points, and that exception handlers be present in all jobs to handle hitting these control points even when not in debug.

Other modifications will be apparent to one of ordinary skill in the art. Therefore, the invention lies in the claims hereinafter appended.

What is claimed is:

1. A method of performing debugging of a computer program in a multi-job environment, the method comprising:
   (a) detecting a control point in a computer program during execution of the computer program in a first job in the computer; and
   (b) interrupting execution of the computer program at the control point if the first job is not currently under debug, the first job has an identifier that is common to another job that established the control point, and another job is waiting to begin servicing a job having the same identifier.

2. The method of claim 1, wherein the identifier includes a user identifier.

3. The method of claim 1, wherein the identifier includes a group identifier.

4. The method of claim 1, wherein the other job waiting to begin servicing a job having the same identifier is a second job, the method further comprising providing a job identifier associated with the first job to the second job.

5. The method of claim 4, further comprising, after providing the job identifier associated with the first job to the second job, initiating a service operation in the second job using the job identifier for the first job.

6. The method of claim 5, further comprising initiating a debug operation in the second job.

7. The method of claim 4, further comprising, prior to detecting the control point, registering the second job as a pending service job for a job having the same identifier as the second job.

8. The method of claim 7, wherein registering the second job includes setting a semaphore for the second job, wherein interrupting execution of the computer program further includes releasing the semaphore for the second job.

9. The method of claim 1, further comprising setting the control point, the control point identifying a user that established the control point.

10. A method of performing a service operation on a computer program in a multi-job environment, the method comprising:
   (a) setting a service entry point in a computer program, the service entry point having associated therewith a user identifier that identifies a user that has initiated setting of the service entry point;
   (b) registering a first job as a pending service job that is waiting to service another job that is owned by the user identified by the user identifier;
   (c) suspending execution of the first job until the service entry point is hit;
   (d) executing the computer program, including creating a second job having a job identifier associated therewith;
   (e) detecting the service entry point during execution of the computer program in the second job;
   (f) providing the job identifier to the first job in response to determining that the second job is not currently under debug, the user identifier associated with the second job matches that associated with the service entry point, and the first job is registered as a pending service job waiting to service another job that is owned by the user identified by the user identifier; and (g) initiating a service operation on the second job using the job identifier provided to the first job.

11. An apparatus, comprising:
(a) a memory, and
(b) a first program resident in the memory, the first program configured to detect a control point in a second program during execution of the second program in a first job in a computer, and interrupt execution of the second program at the control point if the first job is not currently under debug, the first job has an identifier that is common to another job that established the control point, and another job is waiting to begin servicing a job having the same identifier.

12. The apparatus of claim 11, wherein the identifier includes a user identifier.

13. The apparatus of claim 11, wherein the other job waiting to begin servicing a job having the same identifier is a second job, wherein the first program is further configured to provide a job identifier associated with the first job to the second job.

14. The apparatus of claim 13, wherein the first program is further configured to initiate a service operation in the second job using the job identifier for the first job after providing the job identifier associated with the first job to the second job.

15. The apparatus of claim 14, wherein the first program is further configured to initiate a debug operation in the second job.

16. The apparatus of claim 13, wherein the first program is further configured to register the second job as a pending service job for a job having the same identifier as the second job prior to detecting the control point.

17. The apparatus of claim 16, wherein the first program is configured to register the second job by setting a semaphore for the second job, and wherein the first program is configured to interrupt execution of the second program by releasing the semaphore for the second job.

18. The apparatus of claim 11, wherein the first program is further configured to set the control point, the control point identifying a user that established the control point.

19. A program product, comprising:
(a) a first program configured to detect a control point in a second program during execution of the second program in a first job in a computer, and interrupt execution of the second program at the control point if the first job is not currently under debug, the first job has an identifier that is common to another job that established the control point, and another job is waiting to begin servicing a job having the same identifier; and
(b) a computer-readable medium bearing the first program.

20. The program product of claim 19, wherein the computer-readable medium includes at least one of a recordable medium and a transmission medium.

* * * * *